Patented Mar. 8, 1949

2,463,734

UNITED STATES PATENT OFFICE 2,463,734

RACEMIZATION OF OPTICAL ISOMERS

Charles O. Beckmann, Leonia, N. J., assignor to Nopco Chemical Company, a corporation of New Jersey No Drawing. Application November 9, 1945, Serial No. 627,781

8 Claims. (Cl. 260—344)

The present invention relates to the racemization of optical isomers of α hydroxy β,β dimethyl γ butyrolactone. More particularly, the present invention relates to the conversion of the d-lactone to a racemic mixture of l- and d-lactones.

L-α hydroxy β,β dimethyl γ butyrolactone is utilized at present in the synthesis of d-pantothenic acid or its salts by reaction with β alanine or salts thereof. Inasmuch as the d-pantothenic acid is the physiologically active form, it has been customary to resolve the racemic mixture of l- and d-lactones to produce l-lactone prior to the reaction with β alanine. Obviously, one of the products of the resolution is a crude d-lactone which is not suitable for physiological use since the reaction product of d-lactone with β alanine is l-pantothenic acid which is physiologically inactive. Various processes have heretofore been proposed for racemizing the d-lactone to give a racemic mixture of l- and d-lactones which may be resolved into l-lactone, but these methods have not been especially effective. Thus it has been proposed to heat the d-lactone in an autoclave under pressure. However, this process, besides involving high pressures and long periods of time, has resulted only in partial racemization and relatively low yields.

It has been discovered in accordance with the present invention, however, that an optically active isomer of α hydroxy β,β dimethyl γ butyrolactone may be racemized by the catalytic action of an alkali metal alcoholate of a lower alcohol, as, for example, sodium or potassium alcoholate and preferably a compound of sodium or potassium with a lower aliphatic alcohol of from 1 to 4 carbon atoms. Surprisingly, relatively small quantities of sodium or potassium alcoholate serve to catalyze the reaction and this is particularly true where the lactone and solvent used are anhydrous. It is evident, therefore, that the present reaction is a catalytic one.

As stated above, relatively small quantities of sodium or potassium in the form of a sodium or potassium alcoholate catalyze the reaction and result in high yields of racemic α hydroxy β,β dimethyl γ butyrolactone from d-α hydroxy β,β dimethyl γ butyrolactone. For example, .1 mol of sodium as sodium methylate per mol of lactone will give yields of racemic lactone above 90% when the lactone is treated in the presence of 99.5% isopropanol, whereas .05 mol of sodium will only give yields of about 50% under the same conditions. On the other hand, when the isopropanol is absolute and the lactone free from water .05 mol of sodium per mol of lactone will give 90% or greater yields. It may be seen then that the quantity of alkali metal used is dependent upon the quantity of moisture present in the alcohol used and the lactone undergoing racemization. The quantity of alkali metal used should preferably be within the range of .05 to .25 mol per mol of lactone over and above that necessary to dehydrate the system, i. e. the alcohol and lactone. The quantity of alkali metal as specified above does not open the ring of the lactone and consequently form a salt as in the case where a mol equivalent or more is used. This factor constitutes one of the salient features of this invention. The reaction is effective even at room temperatures and atmospheric pressures, but refluxing for a period of about 2 hours is preferable. While longer periods of heating may be resorted to, the yield is usually not materially increased thereby.

The type of alcohol used should be a lower aliphatic alcohol of from 1 to 4 carbon atoms since higher alcohols cannot be easily separated by distillation from the lactone. In general, although a small quantity of the alcoholate may be used as a catalyst a correspondingly larger quantity of the alcohol should be present to act as a solvent or diluent and to promote the progress of the reaction. Suitable compounds for catalyzing the present reaction are sodium methylate, sodium isopropylate, sodium ethylate, etc. Similar compounds of other alkali metals as potassium are also suitable. In practicing the present process, the alkali metal is first dissolved in the alcohol which should be either anhydrous or substantially anhydrous. As previously pointed out, if the alcohol contains any considerable quantity of water, a greater amount of alkali metal must be used to dehydrate the system with the consequent formation of alkali metal hydroxides. Alcoholic solutions of alkali metal hydroxides per se are not suitable as catalysts and accordingly a sufficient amount of an alkali metal alcoholate must be present.

In preparing the solution of alkali metal as, for example, sodium in the alcohol, the sodium may be first dissolved in the alcohol to produce an alcoholate which may then be dissolved in a further quantity of the same or another alcohol. For example, sodium may be reacted with methanol to produce sodium methylate and the sodium methylate may be then dissolved in a larger quantity of methanol or another alcohol such as isopropanol. In the alternative, sodium may be dissolved directly in the quantity of isopropanol to be used in the reaction and then the lactone added thereto. While racemization in the resulting mixture of lactone, alcoholate, and alcohol will proceed at room temperature, it is preferred to reflux the same for a period as, for example, 2 hours. After racemization has proceeded to the desired or optimum point the alcohol is removed by distillation under atmospheric or reduced pressure. Water is then added to decompose the alcoholate and distillation continued to remove any additional alcohol thus produced. Thereafter, the mixture is acidified as, for example, to a pH of 1.0 with an acid such as concentrated hydrochloric acid, heated ½ hour, cooled and neutralized with a suitable alkaline agent as, for example, with potassium carbonate. The pH of the mass after neutralization should preferably fall within the range of 6.0 to 7.0. The lactone may then be removed by extraction with a suitable solvent as, for example, methylene chloride, ethylene chloride or other solvent. The extracts after drying over sodium sulphate or other suitable drying agent are then run down.

The following specific examples serve to illustrate but are not intended to limit the present invention.

Example I

A solution of 2.88 grams of sodium and 500 ml. of isopropanol was prepared. To this solution, 65 gs. d-α hydroxy $\beta,\beta$ dimethyl $\gamma$ butyrolactone were added and the resultant solution was refluxed for 2 hours. The greater part of the alcohol was then removed by distillation and a small amount of water added to decompose the sodium isopropylate. Sufficient concentrated HCl was then added to acidify the solution to a pH of 1 and the acidified solution was heated for ½ hour. After cooling the solution was then neutralized to pH 6–7 with solid potassium carbonate. After extraction of the resultant mixture with methylene chloride, a 91% yield of lactone was obtained $(\alpha)_D +1.8°$. The original $(\alpha)_D$ was $+48.8°$.

Example II 1.73 grams of sodium were dissolved in 20 cc. of methanol and the resultant solution was then added to 480 cc. of isopropanol. After stirring, 50 cc. of this alcoholic solution of sodium were removed and added to 6.5 grams of d-α hydroxy $\beta,\beta$ dimethyl $\gamma$ butyrolactone, $(\alpha)_D +48.8°$. The solution was refluxed at 110° for 2 hours at the end of which time 50 cc. of water were added. The isopropanol was then removed by distillation under reduced pressure and the aqueous residue acidified to pH 1 with concentrated hydrochloric acid and heated for ½ hour on a steam bath. The material was then cooled and neutralized with a saturated solution of potassium carbonate after which it was extracted with five 50 cc. portions of methylene chloride. The extracts were dried over sodium sulfate, filtered and run down. The weight of the crude lactone produced was 5.3 gs. which is equivalent to 82% yield. $(\alpha)_D$ of the crude lactone thus produced was $+9.6°$, equivalent to 79% racemization. It is to be noted that the quantity of sodium used is equivalent to .15 mol per mol of lactone and per liter of isopropanol.

Example III

Example II was repeated except that .05 mol of sodium per mol of lactone per liter absolute isopropanol was used. The yield of the crude lactone was 77% and the $(\alpha)_D +.92°$ equivalent to 93% racemization.

Although in the foregoing specific examples the racemization of the d-lactone is set forth, obviously the present process is similarly applicable to the racemization of the l-lactone.

Having described my invention, what I claim as new and desire to secure by Letters Patent is:

1. A process for the racemization of d-α hydroxy $\beta,\beta$ dimethyl $\gamma$ butyrolactone which comprises treating each mol of said lactone with from about .05 to .25 mol of an alkali metal alcoholate of a monohydric acyclic alcohol having 1 to 4 carbon atoms.

2. A process for the racemization of d-α hydroxy $\beta,\beta$ dimethyl $\gamma$ butyrolactone which comprises treating each mol of said lactone with from about .05 to .25 mol of a sodium alcoholate of a monohydric acyclic alcohol having 1 to 4 carbon atoms.

3. A process for the racemization of d-α hydroxy $\beta,\beta$ dimethyl $\gamma$ butyrolactone which comprises treating each mol of said lactone with from about .05 to .25 mol of an alkali metal alcoholate of a monohydrate acyclic alcohol having 1 to 4 carbon atoms in the presence of a monohydric acyclic alcohol diluent having 1 to 4 carbon atoms.

4. A process for the racemization of d-α hydroxy $\beta,\beta$ dimethyl $\gamma$ butyrolactone which comprises treating each mol of said lactone with from about .05 to .25 mol of an alkali metal alcoholate of a monohydric acyclic alcohol having 1 to 4 carbon atoms in the presence of a substantially anhydrous monohydric acyclic alcohol diluent having 1 to 4 carbon atoms.

5. A process for the racemization of d-α hydroxy $\beta,\beta$ dimethyl $\gamma$ butyrolactone which comprises treating said lactone with .05 to .25 mol of sodium isopropylate per mol of lactone in the presence of isopropanol.

6. A process for the racemization of d-α hydroxy $\beta,\beta$ dimethyl $\gamma$ butyrolactone which comprises treating said lactone with about .05 to .25 mol of sodium methylate per mol of lactone in the presence of isopropanol.

7. A process for the racemization of d-α hydroxy $\beta,\beta$ dimethyl $\gamma$ butyrolactone which comprises treating said lactone with about .05 to .25 mol of sodium isopropylate per mol of lactone in the presence of substantially anhydrous isopropanol.

8. A process for the racemization of d-α hydroxy $\beta,\beta$ dimethyl $\gamma$ butyrolactone which comprises treating said lactone with about .05 to .25 mol of sodium methylate per mol of lactone in the presence of substantially anhydrous isopropanol.

CHAS. O. BECKMANN.

REFERENCES CITED

The following references are of record in the file of this patent:

Stiller et al.: Journal of American Chem. Society, July, 1940, vol. 62, pages 1786–7, 1789.